United States Patent
Arun et al.

(10) Patent No.: US 8,374,868 B2
(45) Date of Patent: Feb. 12, 2013

(54) METHOD OF RECOGNIZING SPEECH

(75) Inventors: Uma Arun, Novi, MI (US); Sherri J Voran-Nowak, Plymouth, MI (US); Rathinavelu Chengalvarayan, Naperville, IL (US); Gaurav Talwar, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 845 days.

(21) Appl. No.: 12/545,148

(22) Filed: Aug. 21, 2009

(65) Prior Publication Data
US 2011/0046953 A1 Feb. 24, 2011

(51) Int. Cl.
*G10L 17/00* (2006.01)
*G10L 21/02* (2006.01)
*G10L 15/00* (2006.01)
*G10L 15/04* (2006.01)
*G10L 11/00* (2006.01)
*G10L 21/00* (2006.01)

(52) U.S. Cl. ........ 704/250; 704/226; 704/239; 704/243; 704/244; 704/246; 704/247; 704/251; 704/254; 704/257; 704/235; 704/270; 704/270.1; 704/273; 704/275

(58) Field of Classification Search .................. 704/226, 704/239, 243, 244, 246, 247, 250, 251, 254, 704/257, 235, 270, 270.1, 273, 275
See application file for complete search history.

(56) References Cited

U.S. PATENT DOCUMENTS

| | | | | |
|---|---|---|---|---|
| 5,548,647 A * | 8/1996 | Naik et al. | | 704/200 |
| 5,583,919 A * | 12/1996 | Talvard et al. | | 379/88.03 |
| 5,903,864 A * | 5/1999 | Gadbois et al. | | 704/251 |
| 5,995,926 A * | 11/1999 | Gupta et al. | | 704/240 |
| 6,049,768 A * | 4/2000 | Goldberg et al. | | 704/273 |
| 6,377,921 B1 * | 4/2002 | Bahl et al. | | 704/243 |
| 6,385,579 B1 * | 5/2002 | Padmanabhan et al. | | 704/243 |
| 6,487,530 B1 * | 11/2002 | Lin et al. | | 704/244 |
| 6,873,951 B1 * | 3/2005 | Lin et al. | | 704/251 |
| 6,922,669 B2 * | 7/2005 | Schalk et al. | | 704/255 |
| 7,013,276 B2 * | 3/2006 | Bickley et al. | | 704/255 |
| 7,047,194 B1 * | 5/2006 | Buskies | | 704/258 |
| 7,181,399 B1 | 2/2007 | Rahim et al. | | |
| 7,269,557 B1 * | 9/2007 | Bailey et al. | | 704/251 |
| 7,421,387 B2 | 9/2008 | Godden | | |
| 7,729,913 B1 * | 6/2010 | Lee et al. | | 704/254 |
| 7,844,456 B2 * | 11/2010 | Cai et al. | | 704/243 |
| 8,244,536 B2 * | 8/2012 | Arun | | 704/270 |
| 2002/0042709 A1 * | 4/2002 | Klisch et al. | | 704/231 |
| 2004/0162726 A1 * | 8/2004 | Chang | | 704/247 |

(Continued)

OTHER PUBLICATIONS

Roe et al. "Prediction of word confusabilities for speech recognition". In Proceedings of the ICSLP Sep. 1994, pp. 227-230.*
Chow, Yen-Lu, et al., "The N-Best Algorithm: An Efficient Procedure for Finding Top N Sentence Hypotheses", BBN Sys&Tech Corp., p. 199-202, aclweb.org/anthology/H/H89/H89-2027.
Pais, Jorge, et al., "The N-Best Heuristic Search Algorithm", 4pgs, http://planning.cis.strath.ac.uk/plansig/pastsigs/salford-18/pais.

(Continued)

*Primary Examiner* — Edgar Guerra-Erazo
(74) *Attorney, Agent, or Firm* — Dierker & Associates, P.C.

(57) ABSTRACT

A method for recognizing speech involves reciting, into a speech recognition system, an utterance including a numeric sequence that contains a digit string including a plurality of tokens and detecting a co-articulation problem related to at least two potentially co-articulated tokens in the digit string. The numeric sequence may be identified using i) a dynamically generated possible numeric sequence that potentially corresponds with the numeric sequence, and/or ii) at least one supplemental acoustic model. Also disclosed herein is a system for accomplishing the same.

24 Claims, 4 Drawing Sheets

U.S. PATENT DOCUMENTS

| | | | |
|---|---|---|---|
| 2005/0119884 A1* | 6/2005 | Breuer | 704/231 |
| 2005/0246172 A1* | 11/2005 | Huang | 704/243 |
| 2006/0215821 A1* | 9/2006 | Rokusek et al. | 379/88.01 |
| 2007/0198264 A1* | 8/2007 | Chang | 704/250 |
| 2008/0126091 A1* | 5/2008 | Clark et al. | 704/246 |

OTHER PUBLICATIONS

Rabiner, Lawrence R., "A Tutorial on Hidden Markov Models and Selected Applications in Speech Recognition", Proceedings of the IEEE, vol. 77, No. 2, Feb. 1989, pp. 257-286.

* cited by examiner

| RECOGNIZED UTTERANCE * | NUMBER OF SPEAKERS |
|---|---|
| 611 | 60 SPEAKERS |
| 61 | 31 SPEAKERS |
| 601 | 8 SPEAKERS |
| 6111 | 1 SPEAKER |

*ACTUAL UTTERANCE = "611"

{ 0, 1, 2, 3, 4, 5, 6, 7, 8, 9, X }

X = 1, 1

METHOD OF RECOGNIZING SPEECH

TECHNICAL FIELD

The present disclosure relates generally to methods of recognizing speech.

BACKGROUND

Co-articulation problems are often evident in user utterances including numeric sequences having one or more digit strings. The co-articulation problem may occur in any spoken language, particularly in tonal-based languages such as, e.g., Mandarin, Min, Taiwanese, and Cantonese. For instance, a numeric sequence having a digit string of "5, 5, 5" in English phonetically equates to "wu, wu, wu" in Mandarin. In some instances, the "wu, wu, wu" utterance may come across, e.g., to a speech recognition system, as "wu, wu", "wu, er, wu", "er, er, er", or some other similar inaccurate variation of the actual utterance.

SUMMARY

A method of recognizing speech is disclosed herein. The method involves reciting, into a speech recognition system, an utterance including a numeric sequence, where the numeric sequence contains a digit string including a plurality of tokens. The method further involves detecting a co-articulation problem related to at least two potentially co-articulated tokens in the digit string. The numeric sequence is identified by using i) a dynamically generated possible numeric sequence that potentially corresponds with the numeric sequence, and/or ii) at least one supplemental acoustic model.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
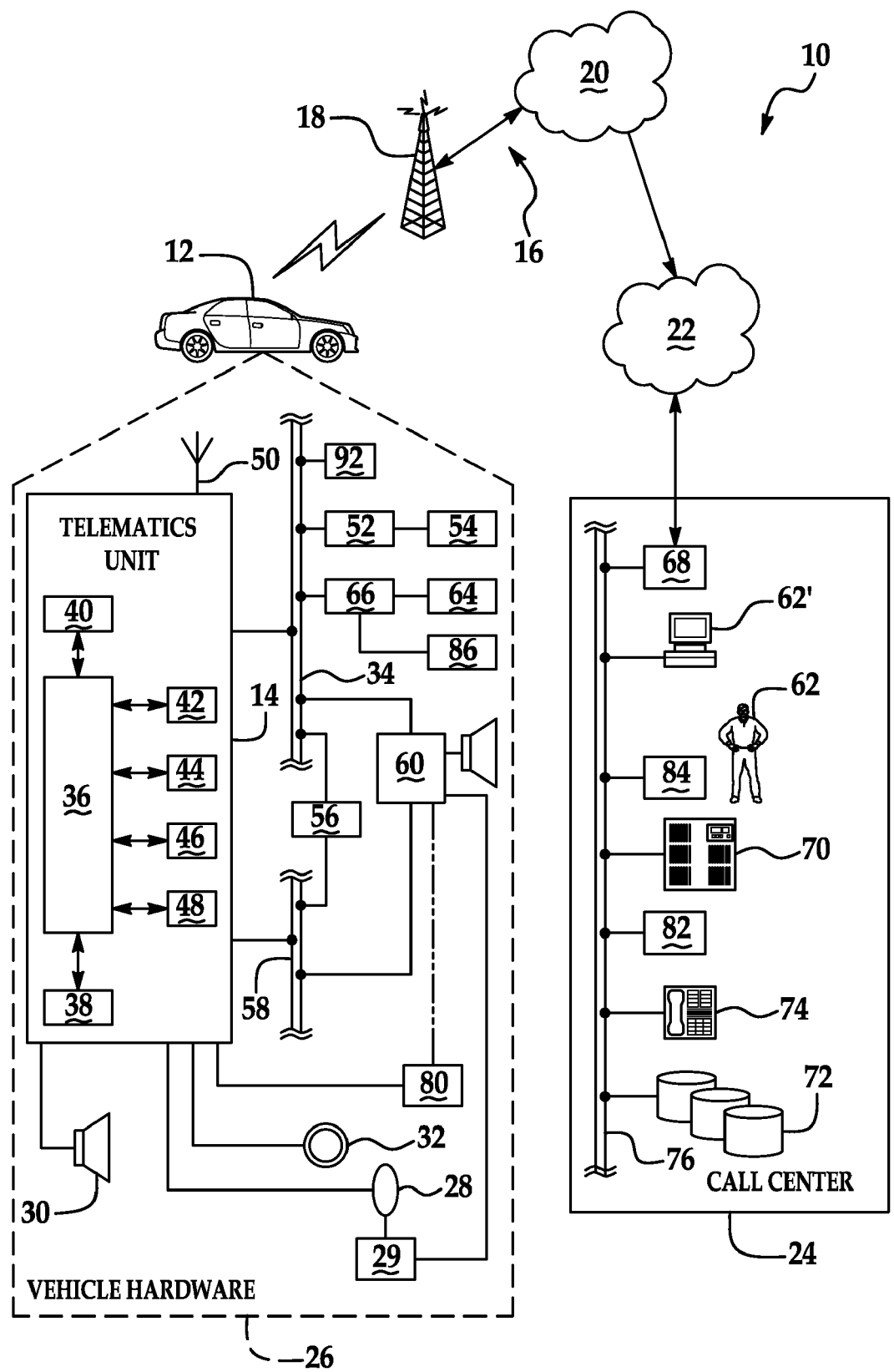
FIG. 1 is a schematic diagram depicting an example of a system for use with examples of a method of recognizing speech as disclosed herein.

Example(s) of the method as disclosed herein may advantageously be used to identify numeric sequences uttered by a user, where such numeric sequences include one or more digit strings having co-articulation problem(s). The method may be used by a speech recognition system, as either a stand-alone system or as a subsystem of another system (such as, e.g., incorporated into a telematics equipped vehicle as shown in FIG. 1), to identify the numeric sequence quickly and with a relatively high percentage of success. Such is often useful when reciting, for example, a credit card number to an automated system when purchasing goods or services. Furthermore, the identifying of the numeric sequence may advantageously be accomplished for utterances spoken in any language, including tonal languages such as Mandarin.

As used herein, the term "numeric sequence" refers to a sequence of numbers or digits uttered, by a user, into a speech recognition system. Some non-limiting examples of numeric sequences include phone numbers, zip codes, social security numbers, student identification numbers, credit card numbers, and/or the like. In some instances, numeric sequences include one or more digit strings. A "digit string", as used herein, refers to a sequence of repeated numbers or digits. Non-limiting examples of digit strings include "5, 5", "9, 9, 9", "2, 2, 2, 2", and/or the like. In some instances, digit strings may contain and/or be susceptible to co-articulation patterns.

As also used herein, the term "token" refers to an orthographic representation of words, expressions, sequences, etc. recited in an utterance. In an example, the numeric sequence "5, 5, 5," includes three tokens (i.e., one for each "5"). In another example, the alphabetic sequence "hello" includes only one token.

Furthermore, the term "co-articulation" refers to the overlap of words uttered or spoken in succession. In instances where co-articulation of two or more words occurs, a co-articulation pattern of the co-articulated words results. In an example, the final sound of a first word uttered merges with the beginning sound of a second word uttered, resulting in one combined sound or word. For instance, an utterance such as "5, 5", when co-articulated, may sound like "fi-five". Co-articulation may also be referred to as the running together of two or more words recited in an utterance. It is to be understood that, "co-articulation problems" or "co-articulation issues" refer to instances where two or more words recited in an utterance are or could be co-articulated.

As also used herein, the term "user" includes a person or other living organism capable of reciting an utterance into a speech recognition system. In some instances, the "user" may also be a non-living entity, such as, e.g., an automaton, robot, or the like, that is also capable of reciting an utterance into a speech recognition system. In many cases herein, the term "user" may be used interchangeably with the phrase "source of the utterance". Furthermore, in instances where the speech recognition system is used in conjunction with a vehicle including, e.g., a telematics unit or other vehicle dedicated communications device, the term "user" may refer to a vehicle owner, operator, and/or passenger. In these instances, the term "user" may be used interchangeably with the term subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

It is to be understood that the examples of the method disclosed herein may be performed in any system using speech recognition systems and/or software. Examples of such systems include, but are not limited to, data entry systems (such as systems used for entering credit card information for purchasing retail items, services, or the like), systems for preparing documents (such as systems used for preparing diagnostic or medical reports), speech-to-text computer systems (such as word processors or e-mail systems), systems used in mobile vehicles (such as systems using telematics units to obtain services, etc.), and/or the like. For purposes of illustration, the examples of the method will be described hereinbelow for use in conjunction with a telematics-equipped motor vehicle.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands (such as, e.g., an utterance including a numeric sequence), and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

Figure 2:
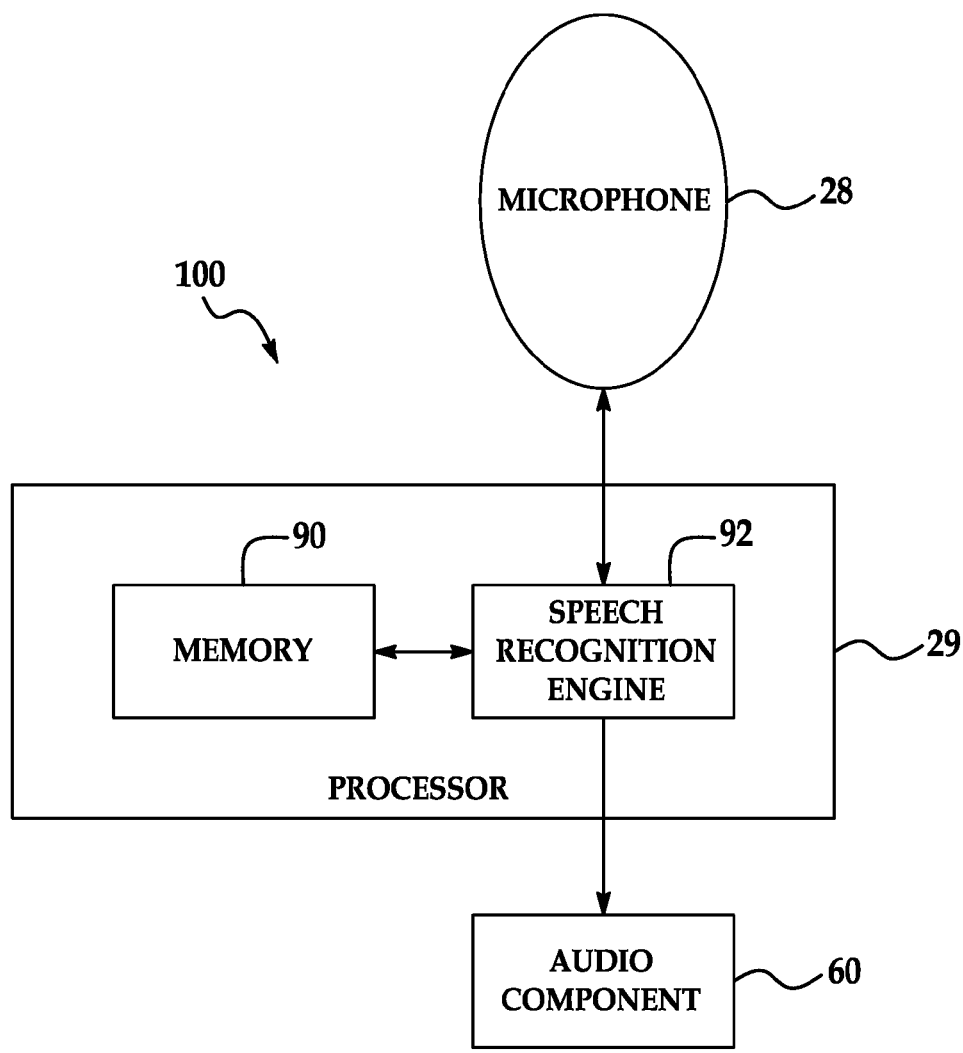
FIG. 2 is a schematic diagram depicting an example of a speech recognition system.
Figure 7:
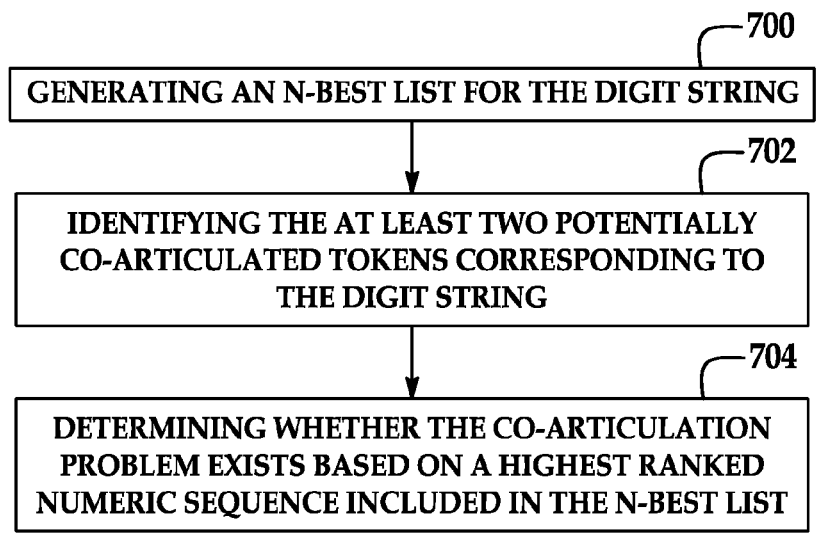
FIG. 7 is a flow diagram depicting another example of a method of identifying a numeric sequence included in an utterance.

The microphone 28 is also selectively and operatively connected to a processor 29. As shown in FIG. 2, the processor 29 includes a memory 90 and a speech recognition engine 92. The speech recognition engine 92 is configured to run one or more software programs and/or software routines having computer readable code for performing various steps of the examples of the method described below. The memory 90 is configured to store information for use in performing the various steps of the method. For example, the memory 90 may have stored therein a base acoustic model and one or more supplemental acoustic models for use in performing one of the examples of the method disclosed herein. In this example, the speech recognition engine 92 selectively and operatively communicates with the memory 90 to obtain and use one or more of these models to ultimately identify a numeric sequence recited in an utterance. Details of this example will be described below in conjunction with FIGS. 4-6. The memory 90 may also or otherwise be configured to temporarily store an N-best list dynamically generated by the speech recognition engine 92 when attempting to identify an uttered numeric sequence. Further details of this example of the method will be described below in conjunction with FIGS. 7 and 8.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The audio component 60 is also selectively and operatively connected to the processor 29. In at least some of the examples disclosed herein, the audio component 60 is also configured to recite, in response to a command from the processor 29, one or more possible numeric sequences (generated by the speech recognition engine 92) to the source of the utterance (e.g., the user of the vehicle 12) to ultimately determine whether or not the utterance was identified correctly. Further details of these examples will also be described below.

The combination of the microphone 28, the processor 29 (including the memory 90 and the speech recognition engine 92), and the audio component 60 is referred to herein as a "speech recognition system", and is identified by reference numeral 100 in FIG. 2. For purposes of the examples of the method described herein, the speech recognition system 100 is a sub-system of the system 10 depicted in FIG. 1. To reiterate from above, the speech recognition system 100 may be incorporated into other systems or, in some cases, may be used as a standalone system.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 3:
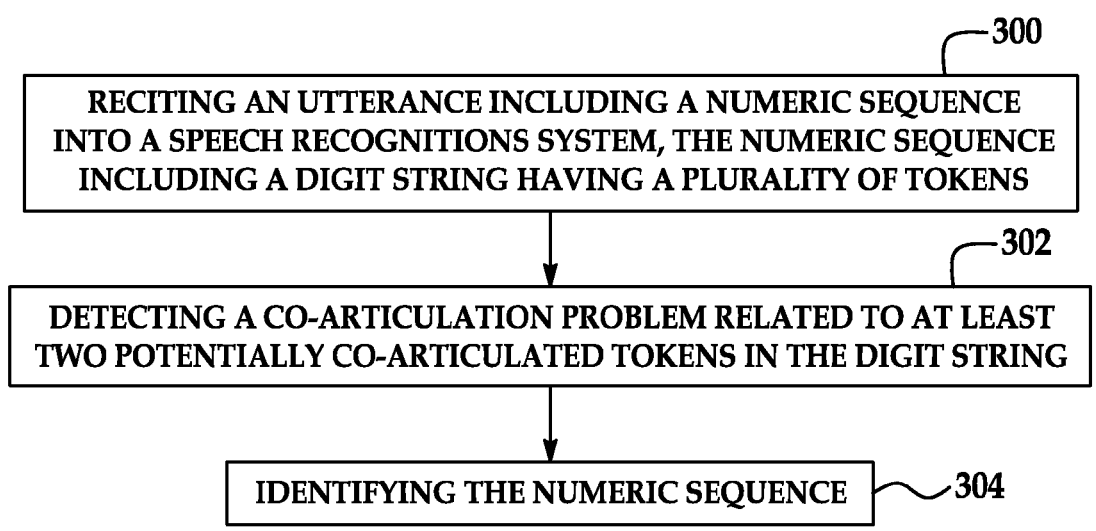
FIG. 3 is a flow diagram depicting an example of a method of recognizing speech.

An example of a method of recognizing speech is generally depicted in FIG. 3. The method includes: reciting, into the speech recognition system 100, an utterance including a numeric sequence, the numeric sequence including a digit string having a plurality of tokens (as shown by reference numeral 300); detecting a co-articulation problem related to at least two potentially co-articulated tokens in the digit string (as shown by reference numeral 302); and identifying the numeric sequence (as shown by reference numeral 304).

The reciting of the utterance into the speech recognition system 100 may be accomplished by uttering at least the numeric sequence into the microphone 28. The utterance passes through the microphone 28 and is directly inputted into the speech recognition engine 92 of the processor 29. The utterance may include an alphabetic sequence, an alphabetic sequence in combination with a numeric sequence, or a numeric sequence alone. For example, the user may recite "my phone number is 248-555-9611" into the microphone 28. The portion of the utterance including "my phone number is" is considered to be an alphabetic sequence, whereas the portion of the utterance including "248-555-9611" is considered to be a numeric sequence. In this example, the numeric sequence includes two co-articulated patterns; i) 5, 5, 5, and ii) 1, 1. Furthermore, the entire utterance includes fourteen tokens; ten of which pertain to the numeric sequence alone.

Once the utterance has been recited into the speech recognition system 100, the speech recognition engine 92 may apply one method or multiple different methods (run or performed by appropriate software programs and/or routines) to identify the utterance. One example of such a method will now be described in conjunction with FIGS. 4-6. This example of the method involves identifying the numeric sequence using at least one supplemental acoustic model.

Figures 4, 5, 6:
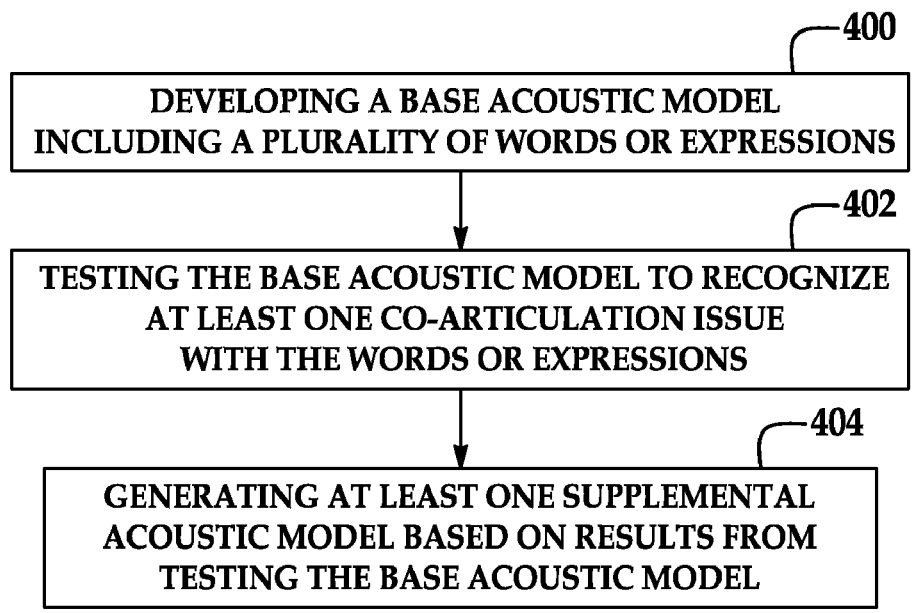
FIG. 4 is a flow diagram depicting an example of a method of identifying a numeric sequence included in an utterance.
FIG. 5 is an example of a confusability matrix for the utterance "6, 1, 1"
FIG. 6 is an example of acoustic models for the utterance "6, 1, 1"

Referring now to FIG. 4, the method of identifying the numeric sequence using the supplemental acoustic model(s) includes developing a base acoustic model including a plurality of words or expressions (as shown by reference numeral 400 in FIG. 4). The base acoustic model may be developed using any suitable speech recording method known by one skilled in the art. One example of developing the base acoustic model involves taking a plurality of audio recordings of various utterances spoken by a number of different sources and developing the base acoustic model from the audio recordings. In this example, a speaker (who may be placed in front of a computer having a microphone operatively connected thereto) responds to a set of guided utterances prompted by a computer display, a set of written instructions, or some other means. In one example, the guided utterances are generated using suitable speech recognition software programs run by the computer. The guided utterances may, for example, include a request for the speaker to utter particular words, phrases, sequences, expressions, etc. recognizable by the computer programs. Examples of the guided utterances may include, for example, the number "two", the sequence "five, five", the phrase "place a call," the expression "Good morning!", and/or the like. The utterances (including phonemes) are recorded, digitized, and analyzed to ultimately develop a Gaussian distribution for each particular word, expression, etc. In many cases, a textual transcription may also be formed for each utterance. Such textual transcriptions may be used for a variety of purposes such as, e.g., to provide a textual representation of the utterance itself. Software is used to create the Gaussian distribution, which includes statistical representations of the sounds that make up each word of the recording and textual transcription. As such, the utterances are assigned statistical numeric values (i.e., the parameters used to develop the Gaussian distributions). The recorded utterances encoded as parameters (including their numeric statistical values and textual transcriptions) are then saved in a database referred to herein as the base acoustic model.

The base acoustic model may then be tested to recognize any potential co-articulation issues or problems with one or more of the words, phrases, sequences, and/or expressions saved therein (as shown by reference numeral 402 in FIG. 4). Testing may be accomplished, for example, by reciting a set of utterances (such as, e.g., the same utterances prompted by the guided utterances) into the computer running the speech recognition software programs used to develop or train the base acoustic model as described above. When an utterance is spoken into the system 100, the word(s) is/are analyzed and compared to words in the base acoustic model. A probability value is associated with the utterance and a potential match in the acoustic model. The higher the probability value, the more likely it is that the speaker uttered the word(s) that is/are resident in the case acoustic model.

The frequency of recognition errors for a set of utterances is analyzed to determine which utterances are most often misrecognized. Thereafter, a confusability matrix for each the words, phrases, etc. is generated based on the testing of the base acoustic model.

The confusability matrix is a statistical tool that may be used to determine if a system (such as the speech recognition system 100) is confusing an actual class (e.g., an actual utterance) with a predicted class (e.g., a predicted utterance). In the example described herein, the predicted utterance is derived from what the speech recognition system 100 thought the actual utterance was during the testing of the base acoustic model. For example, the system 100 may have misrecognized that the utterance "6, 1, 1" as "6, 1", "6, 1, 1, 1", "6, 0, 1", or the like. An example of a confusability matrix for the utterance "6, 1, 1" is shown in FIG. 5. It is to be understood that the confusability matrix shown in FIG. 5 has been simplified in order to facilitate understanding. In this example, the confusability matrix reveals that, for instance, for 60 of the speakers tested, the system 100 correctly understood the utterance to be "6, 1, 1", however, i) for 31 of the speakers, the system 100 incorrectly understood the utterance to be "6, 1" (this is an example that is often referred to as a deletion error), ii) 8 of the speakers incorrectly understood the utterance to be "6, 0, 1" (this is an example that is often referred to as a replacement error, or simply an error), and iii) for 1 speaker, the system 100 incorrectly understood the utterance to be "6, 1, 1, 1" (this is an example that is often referred to as an insertion error).

From the confusability matrix, one can deduce the frequency of a common co-articulation problem with the utterance "6, 1, 1". As used herein, a "common co-articulation problem" refers to a co-articulation problem that is reoccurring and is determined by the testing of the base acoustic model. Such common co-articulation problems are typically expected in speech recognition. For instance, from the confusability matrix, it can be concluded that the system 100 confuses the utterance "6, 1, 1" with "6, 1", "6, 1, 1, 1", or some other variation. The analysis of the test data indicates that the system 100 has a common co-articulation problem with this particular utterance.

Upon recognizing the common co-articulation problem with the utterance "6, 1, 1", at least one supplemental acoustic model may be generated for the utterance, if the co-articulation problem exceeds a predetermined threshold. In a non-limiting example, if the system 100 misrecognized at least 10% of the utterances, then at least one supplemental acoustic model may be generated to accommodate the typically misrecognized sequence. It is to be understood that the predetermined threshold may vary depending, at least in part, on the criticality of the application for which the model is used. For instance, at least one supplemental acoustic model may be generated for the utterance if the co-articulation problem exceeds a percentage of, e.g., 20% in critical applications such for as medical transcriptions or the like. In other words, one or more supplemental acoustic models may be generated based on the results of the testing of the basic acoustic model (as shown by reference numeral 404 in FIG. 4), where the supplemental models are specifically designed to accommodate the common co-articulation problem. An example of acoustic models for the utterance "6, 1, 1" is shown in FIG. 6.

Referring now to the example shown in FIG. 6, the base acoustic model includes the digits from 0 to 9, and the supplemental acoustic model is identified by X, which is the tagged digit sequence "1, 1". The tagged digit sequence generally represents a sequence of numbers having at least two co-articulated tokens. In many cases, the sequence of numbers represented by X includes a digit string. As shown in FIG. 6, for instance, the tagged digit sequence identified by character X represents 1, 1. As will be described further below, the character X is applied by the speech recognition engine 92 any time the supplemental acoustic model is switched in, in place of the base acoustic model. As such, the supplemental acoustic model may be used in conjunction with the base acoustic model in order to accurately interpret an utterance.

In an example, the speech recognition system 100 invokes the supplemental acoustic model shown in FIG. 6 when the system 100 cannot recognize the "1, 1" portion of the "6, 1, 1" utterance (i.e., the tokens 1, 1, are potentially co-articulated) with high statistical probability using the base acoustic mode. In such instances, the system 100 determines that a co-articulation problem exists, and searches the supplemental acoustic model for a match with the problematic portion of the utterance. More specifically, when a user recites the utterance into the microphone 28, the speech recognition engine 92 converts acoustic energy of the uttered sequence into a digital bit pattern, and attempts to match the digital bit pattern of the utterance with patterns in the base acoustic model. The speech recognition engine 92 generates a probability score for the utterance, and this score will be compared to the scores in the base acoustic model. In an example, the probability score may be generated using a suitable estimation algorithm such as a Viterbi-style algorithm used in conjunction with a hidden Markov model. Such probabilities are then generated for potential matches. Using the example above, if the user utters "6, 1, 1", when making the comparison with the base acoustic model, the system 100 determines, for example, that there is a 62% chance that the utterance equals "6, 1" and a 51% chance that the utterance equals "6, 1, 1". These probabilities are low, even though the correct match between the utterance and the model has been made.

If the probability score for a potential match is above a predetermined percentage (e.g., which may be any percentage between about 60% and about 75%), the speech recognition engine 92 assumes that the numeric sequence recited in the utterance does not have a co-articulation problem. If no co-articulation problem is evident, the speech recognition system 100 then applies the utterance in the base acoustic model having the highest probability to identify the numeric sequence in the spoken utterance. For example, from the base acoustic model, the speech recognition engine 92 retrieves the digit "6", the digit "1", and the digit "1", in sequence. In some instances, the identified numeric sequence is automatically applied to fulfill the request, command, etc. submitted by the user when the utterance was originally made. In other instances, the system 100 may otherwise submit a command to the microphone 28 to recite the numeric sequence back to the user for verification. In instances where the numeric sequence recited back to the user is incorrect, the system 100 may i) ask the user to repeat the utterance and reapply the instant example of the identification method, or ii) automatically apply a supplemental acoustic model to identify the sequence.

Referring back to the comparing of the probability score with the predetermined percentage, if the probability score falls below the predetermined percentage (i.e., is below 75% or 65%, for example), the speech recognition engine 92 switches the base acoustic model with at least one of the supplemental acoustic models. The system 100 then applies the supplemental acoustic model(s) to identify the numeric sequence. For instance, if the user utters the numeric sequence "6, 1, 1", the system 100 recognizes, based on the testing described above, that the utterance is known to have a common co-articulation problem (i.e., the "1, 1" portion). Again using the example provided hereinabove, if the speech recognition engine 92 determines that the probability that the utterance is "6, 1" is about 62% and the probability that the utterance is "6, 1, 1" is about 51% (both of which are below the lowest 65% threshold), the speech recognition engine 92 switches to the supplemental acoustic model.

The numeric sequence included in the utterance may then be identified using the supplemental acoustic model. More specifically, the base acoustic model may be used to identify the "6" with a high probability, and the supplemental acoustic model may be used to replace the "1, 1" sequence included in the utterance with the reference character X representing "1, 1" (which was specifically created for the particular utterance). Thereafter, the speech recognition engine 92 recalculates the probability score for the utterance. In an example, if the probability that the utterance corresponds with character X (i.e., is "1, 1") is about 76%, then the system 100 will replace the co-articulated sequence in the utterance with the character X (or "1, 1").

It is to be understood that if more than one possibility is evident using the supplemental acoustic model(s) (e.g., the model includes character X and character Y that are both possible matches for the utterance), a probability will be calculated for each possibility. The system 100 will then select the character having the highest probability value, which represents the utterance actually recited by the user.

When the supplementary acoustic model is used to identify the spoken utterance, the system 100 may automatically apply the matched character to fulfill the request, command, etc. submitted by the user when the utterance was originally made, or the system 100 may otherwise submit a command to the microphone 28 to recite the matched numeric sequence back to the user for verification. In instances where the numeric sequence recited back to the user is incorrect, the system 100 may ask the user to repeat the utterance and reapply the instant example of the identification method.

In another example, the identifying of the numeric sequence included in the utterance may be accomplished using a dynamically generated possible numeric sequence that potentially corresponds with the uttered numeric sequence. Referring back to FIG. 3, and to reiterate from above, after the utterance is recited into the speech recognition system 100 (as identified by reference numeral 300), the method includes detecting a co-articulation problem related to at least two potentially co-articulated tokens in the digit string (as identified by reference numeral 302). In this example, the detecting of the co-articulation problem may be accomplished using an N-best list. In an example, the method includes: generating an N-best list for the digit string included in the numeric sequence (as shown by reference numeral 700); identifying at least two potentially co-articulated tokens corresponding to the digit string (as shown by reference numeral 702); and determining whether the co-articulation problem exists based on a highest ranked numeric sequence included in the N-best list (as shown by reference numeral 704).

As used herein, an "N-best list" is a list of possibilities that an utterance could be. The N-best list may be generated using an N-best algorithm (run, e.g., by the speech recognition engine 92) to determine an N number of possibilities and a ranking (i.e., confidence score) for each of the possibilities (i.e., 1-best possibility, 2-best possibility, etc.). The N-best algorithm may, for example, be a Viterbi-style search algorithm that uses a hidden Markov model based on a sequence of previously observed outputs obtained from a plurality of users during a speech testing process. With reference to the instant disclosure, the N-best list may be generated for the digit string included in the uttered numeric sequence. The N number of most likely possibilities includes a plurality of possible numeric sequences, each of which potentially corresponds with the numeric sequence recited in the utterance. Each of the most likely possibilities has associated therewith a confidence score, which is mathematically determined by the N-best algorithm. The possibilities are then ranked from a highest possibility in sequential order to a lowest possibility based on the confidence scores. For example, the N-best list for the utterance "5, 5, 5" may include "5, 5, 5" as the 1-best possibility if it has the highest confidence score, "5, 5" as the 2-best possibility if it has the next highest confidence score, and so on.

In an example, the user utters a numeric sequence such as "248-555-9611" into the microphone 28. Upon receiving the utterance, the speech recognition system 100 recognizes that the numeric sequence includes two digit strings: i) "5, 5, 5", and ii) "1, 1", and dynamically generates an N-best list for each digit string.

After each N-best list is generated, the system 100 identifies at least two potentially co-articulated tokens corresponding to the digit strings. The identifying may be accomplished, for example, by submitting a command to the audio component 60 from the speech recognition engine 92 to recite the uttered numeric sequence (as currently identified by the speech recognition engine 92) back to the user for verification. In instances where the user indicates that the numeric sequence recited by the audio component 60 is incorrect, he/she may render such indication either verbally (e.g., by talking into the microphone 28) or physically (e.g., via a button press indicating as such). Upon receiving the user's indication that the recited numeric sequence is incorrect, the speech recognition engine 92 determines that the numeric sequence includes at least two potentially co-articulated tokens. For example, as shown by reference numeral 800 in FIG. 8, if the actual utterance is "5, 5, 5" but the system 100 articulated the digit string to be "5, 5", the user will indicate that the sequence is incorrect. At this point, the system 100 recognizes that the tokens included in the "5, 5, 5" digit string (as understood by the system 100) are probably co-articulated.

In another example, the at least two potentially co-articulated tokens present in the digit string may be identified by recognizing that the source of the utterance (e.g., the user of the system 100) typically or consistently co-articulates one or more particular digit strings. For instance, a profile of the source may be generated and saved by, e.g., the memory 90 of the speech recognition system 100, where such profile includes instances of co-articulation issues associated with utterances made by the user thereof. Depending, at least in part, on the frequency of the co-articulation issue associated with one or more particular digit strings recited in the utterances, the user may be classified as one who consistently co-articulates certain digit strings recited in his/her utterances. In such cases, the system 100 may automatically recognize such digit strings, if recited in a then-current utterance, as being co-articulated. Such recognition may be made, e.g., without having to verify the fact directly with the user.

Figure 8:
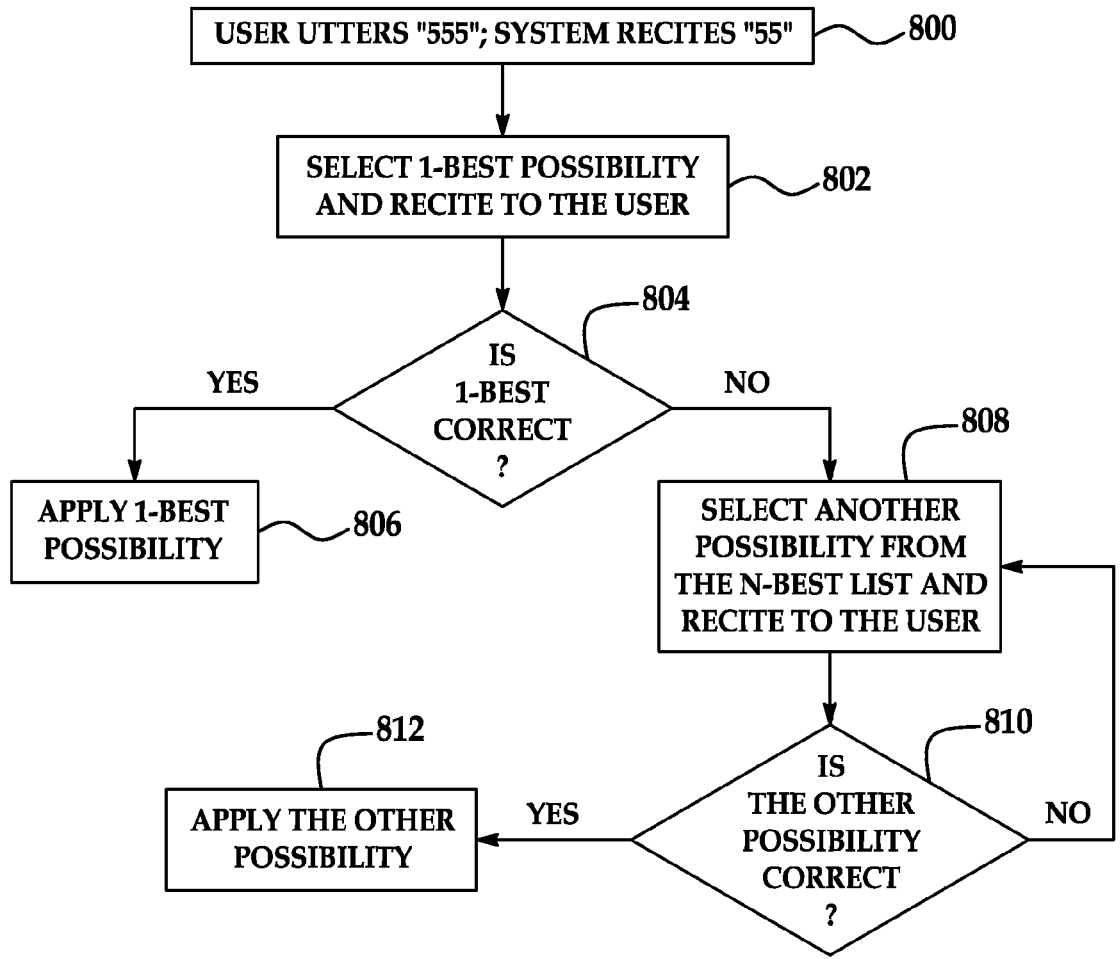
FIG. 8 is a flow diagram depicting an example of the method shown in FIG. 7.

After identifying that at least two of the tokens in the digit string are most likely co-articulated, the speech recognition engine 92 selects the highest ranked numeric sequence (i.e., the 1-best possibility) from the N-best list and submits a command to the audio component 60 to recite the selected numeric sequence back to the user (as shown by reference numeral 802 in FIG. 8). The user will either i) verify the sequence, or ii) indicate that the numeric sequence is incorrect via the means described above (as shown by reference numeral 804 in FIG. 8).

In an example, if the user indicates that the 1-best numeric sequence is correct, he/she will indicate as such. In this example, the selected numeric sequence is applied by the system 100 to complete the task the system 10 was originally asked to perform by the user (e.g., to purchase the retail item using the credit card information, to place a phone call using a particular phone number, etc.) (as shown by reference numeral 806 in FIG. 8).

In another example, if the user indicates that the 1-best numeric sequence or possibility is incorrect, the speech recognition engine 92 determines that a co-articulation problem does in fact exist. Upon making this determination, the speech recognition engine 92 scans the possible numeric sequences included in the N-best list for the at least two potentially co-articulated tokens. Typically, the scanning takes place in order from the second highest ranked possible numeric sequence to a lowest ranked possible numeric sequence. During the scanning of the possible numeric sequences, the speech recognition engine 92 (using an appropriate software routine) chooses the next highest ranked possibility from the N-best list and calculates a difference between the confidence score of that numeric sequence and the originally selected possible numeric sequence (in this case, the 1-best possibility). The chosen sequence is selected by the speech recognition engine 92 if the results of the calculation (i.e., the difference between the confidence scores) fall within a predetermined threshold (as shown by reference numeral 808 in FIG. 8). In a non-limiting example, the predetermined threshold ranges from about 25% to about 30%. It is to be understood, however, that the predetermined threshold may, for example, be higher for more critical applications such as, e.g., for medical transcriptions or the like. The originally selected possible numeric sequence (again, in this case, the 1-best possibility) is then swapped out for the newly selected possibility (i.e., the possibility having a difference between the confidence scores that fall within the predetermined threshold). For example, if the confidence scores of the 1-best and the 2-best possibilities are 90% and 75%, respectively, then the difference between the scores is 15%. Assuming that the predetermined threshold is 25%, the 1-best possibility would be swapped for the 2-best possibility because the difference (of 15%) is less than the predetermined threshold. In another example, if the 2-best possibility has a confidence score of 60%, then the difference between the scores would be 30%. In this example, such difference (of 30%) is higher than the predetermined threshold (of 25%) and, thus, the 2-best possibility would be ignored. In instances where more than one possibility in the N-best list has a difference that falls below the predetermined threshold, then both possibilities may be selected and ultimately presented to the user for verification.

It is to be understood that if the speech recognition engine 92 recognizes that the difference between the confidence score of the chosen numeric sequence and the originally selected numeric sequence falls outside of the predetermined threshold, the N-best list will be re-scanned and another possibility will be chosen. The speech recognition engine 92 then calculates the difference between the confidence score of this next chosen possibility and the originally selected possibility. If the difference falls within the threshold, then the next chosen possibility will be selected by the engine 92. If the difference falls outside of the threshold, then the engine 92 re-scans the N-best list again. It is to be understood that the re-scanning may be accomplished until i) one of the possibilities produce a difference that falls within the threshold, or ii) all of the possibilities have been scanned. In the latter instance, the system 100 may ask the user to repeat the utterance and a new N-best list may be generated.

Referring back to FIG. 8, after selecting one of the possibilities from the N-best list, the speech recognition engine 92 submits another command to the audio component 60 to recite the newly selected possible numeric sequence to the user (as also shown by reference numeral 808 in FIG. 8). The user again may indicate whether or not the newly selected possible numeric sequence is correct or incorrect (as shown by reference numeral 810 in FIG. 8). If, for example, the user indicates that the newly selected possible numeric sequence is correct, the newly selected possible numeric sequence is considered to be the actually uttered sequence and may be applied by the system 10 (as shown by reference numeral 812 in FIG. 8).

It is to be understood that if the user indicates that the newly selected possible numeric sequence is incorrect, the method described above repeats itself for another possible numeric sequence selected from the N-best list. In some instances, the other possible numeric sequence is ranked lower in the N-best list than any of the previously selected possibilities.

After i) all of the possibilities included in the N-best list has been tried, or ii) a predefined number of iterations has been completed, the speech recognition engine 92 may submit a command to the audio component 60 to request that the user repeat the utterance. In some cases, the request to repeat the utterance includes prompting the user to recite the utterance in a predefined manner. For example, the system 100 may prompt the user to repeat the utterance more slowly so that the system 100 can more carefully articulate the utterance. The user may then recite the utterance into the microphone 28, after which the speech recognition engine 92 re-generates the N-best list based on the repeated utterance. The several steps of the method described hereinabove may then be applied to identify the repeated utterance.

It is to be understood that the methods disclosed herein may be used together. For example, the N-best method described in connection with FIGS. 7 and 8 may be used to identify a co-articulation problem with the utterance, and then the supplementary acoustic model (described in connection with FIGS. 4-6) may be switched in to find a character specifically associated with the co-articulated utterance.

While several examples have been described in detail, it will be apparent to those skilled in the art that the disclosed examples may be modified. Therefore, the foregoing description is to be considered exemplary rather than limiting.

The invention claimed is:

1. A method of recognizing speech, comprising:
reciting, into a speech recognition system, an utterance including a numeric sequence, the numeric sequence containing a digit string including a plurality of tokens;
detecting a co-articulation problem related to at least two potentially co-articulated tokens in the digit string; and
identifying the numeric sequence using one of i) a dynamically generated possible numeric sequence that potentially corresponds with the numeric sequence, or ii) at least one supplemental acoustic model.

2. The method as defined in claim 1 wherein prior to the detecting of the co-articulation problem, the method further comprises:
developing a base acoustic model including a plurality of words or expressions each assigned with a statistical numeric value;
testing the base acoustic model to recognize at least one co-articulation issue with the plurality of words or expressions; and
generating the at least one supplemental acoustic model based on results from the testing of the base acoustic model.

3. The method as defined in claim 2 wherein the testing of the base acoustic model includes:
reciting a set of utterances into the speech recognition system;
comparing the set of utterances with a confusability matrix; and
from the comparing, determining a frequency of a common co-articulation problem with at least one utterance in the set of utterances.

4. The method as defined in claim 3 wherein the at least one supplemental acoustic model is generated when the frequency of the common co-articulation problem exceeds a predetermined threshold.

5. The method as defined in claim 4 wherein the co-articulation problem related to the at least two potentially co-articulated tokens in the digit string is detected, and wherein the method further comprises:
converting acoustic energy of the utterance into a digital bit pattern; and
comparing the digital bit pattern of the utterance with patterns included in the at least one supplemental acoustic model; and
generating a probability score based on the comparison.

6. The method as defined in claim 5 wherein if the probability score exceeds a predetermined percentage, the method further comprises switching the base acoustic model with the at least one supplemental acoustic model.

7. The method as defined in claim 1 wherein the at least one supplemental acoustic model includes a character representing a string of at least two co-articulated tokens.

8. The method as defined in claim 1 wherein the detecting of the co-articulation problem includes:
generating an N-best list for the digit string, the N-best list including a plurality of possible numeric sequences, each of which potentially corresponds with the numeric sequence recited in the utterance, wherein each of the plurality of possible numeric sequences is ranked according to a confidence score;
identifying the at least two potentially co-articulated tokens corresponding to the digit string; and
determining whether the co-articulation problem exists based on a highest ranked possible numeric sequence included in the N-best list.

9. The method as defined in claim 8 wherein after the identifying of the at least two potentially co-articulated tokens, the method further comprises:
reciting the highest ranked numeric sequence to a source of the utterance; and
indicating, by the source to the speech recognition system, that the highest ranked numeric sequence is incorrect.

10. The method as defined in claim 9 wherein the co-articulation problem exists, and wherein the method further comprises:
scanning the plurality of possible numeric sequences included in the N-best list for the at least two potentially co-articulated tokens, the scanning being accomplished in order starting from a second highest ranked possible numeric sequence to a lowest ranked possible numeric sequence; and
selecting one of the scanned possible numeric sequences when a difference between the confidence score of the selected possible numeric sequence and that of the highest ranked numeric sequence falls within a predetermined threshold.

11. The method as defined in claim 10, further comprising:
reciting the selected possible numeric sequence to the source of the utterance; and
indicating, by the source to the speech recognition system, whether the selected possible numeric sequence is correct.

12. The method as defined in claim 11 wherein when the selected possible numeric sequence is determined to be correct, the method further comprises applying the selected possible numeric sequence.

13. The method as defined in claim 10 wherein when the selected possible numeric sequence is determined to be incorrect, the method further comprises:
selecting an other of the scanned possible numeric sequences, the other possible numeric sequence ranked lower in the N-best list than a previously selected possible numeric sequence; and
reciting the other selected possible numeric sequence to the source of the utterance.

14. The method as defined in claim 13, further comprising:
indicating, by the source of the utterance to the speech recognition system, that the other selected possible numeric sequence is incorrect;
requesting that the source repeat the utterance; and
re-generating the N-best list based on the repeated utterance.

15. The method as defined in claim 14 wherein the requesting to repeat the utterance includes prompting the source of the utterance to recite the utterance in a predefined manner.

16. The method as defined in claim 9 wherein the co-articulation problem exists, and wherein the method further comprises:
scanning the plurality of possible numeric sequences included in the N-best list for the at least two potentially co-articulated tokens, the scanning being accomplished in order starting from a next highest ranked possible numeric sequence to a lowest ranked possible numeric sequence;
recognizing that a difference between the confidence score of the next highest ranked possible numeric sequence and that of the highest ranked numeric sequence falls outside a predetermined threshold; and
re-scanning the plurality of possible numeric sequences included in the N-best list for the at least two potentially co-articulated tokens, the re-scanning being accomplished in order starting from a third highest ranked possible numeric sequence to the lowest ranked possible numeric sequence, and the re-scanning continuing through the N-best list until a difference between a confidence score of one of the possible numeric sequence and that of the highest ranked numeric sequence falls within the predetermined threshold.

17. The method as defined in claim 8 wherein after the identifying of the at least two potentially co-articulated tokens, the method further comprises:
   reciting the highest ranked numeric sequence to a source of the utterance; and
   indicating, by the source to the speech recognition system, that the highest ranked numeric sequence is correct.

18. A system for recognizing speech, comprising:
   a microphone configured to receive an utterance from a source, the utterance including a numeric sequence having a digit string including a plurality of tokens; and
   a processor selectively and operatively connected to the microphone, the processor including:
      computer readable code for detecting a co-articulation problem related to at least two potentially co-articulated tokens in the digit string; and
      computer readable code for identifying the numeric sequence using one of i) a dynamically generated possible numeric sequence that potentially corresponds with the numeric sequence, or ii) at least one supplemental acoustic model.

19. The system as defined in claim 18 wherein the computer readable code for identifying the numeric sequence using at least one supplemental acoustic model includes:
   computer readable code for developing a base acoustic model including a plurality of words or expressions, each assigned with a statistical numeric value;
   computer readable code for testing the base acoustic model to recognize at least one co-articulation issue with the plurality of words or expressions; and
   computer readable code for generating the at least one supplemental acoustic model based on results from the testing of the base acoustic model.

20. The system as defined in claim 19 wherein the computer readable code for identifying the numeric sequence using at least one supplemental acoustic model further includes:
   computer readable code for converting acoustic energy of the utterance into a digital bit pattern;
   computer readable code for comparing the digital bit pattern of the utterance with patterns included in the at least one supplemental acoustic model;
   computer readable code for generating a probability score based on the comparison; and
   computer readable code for switching the base acoustic model with the at least one supplemental acoustic model upon recognition of the probability score exceeding a predetermined percentage.

21. The system as defined in claim 18 wherein the computer readable code for identifying the numeric sequence using the dynamically generated possible numeric sequence includes:
   computer readable code for generating an N-best list for the digit string, the N-best list including a plurality of possible numeric sequences, each of which potentially corresponds with the numeric sequence recited in the utterance, wherein each of the plurality of possible numeric sequences is ranked according to a confidence score;
   computer readable code for identifying at least two potentially co-articulated tokens corresponding to the digit string; and
   computer readable code for determining whether a co-articulation problem exists based on a highest ranked possible numeric sequence included in the N-best list, the co-articulation problem related to the at least two potentially co-articulated tokens.

22. The system as defined in claim 21 the computer readable code for identifying the numeric sequence using the dynamically generated possible numeric sequence further includes:
   computer readable code for scanning the plurality of possible numeric sequences included in the N-best list for the at least two potentially co-articulated tokens, the scanning being accomplished in order starting from a next highest ranked possible numeric sequence to a lowest ranked possible numeric sequence; and
   computer readable code for selecting one of the scanned possible numeric sequences when a difference between the confidence score of the selected possible numeric sequence and that of the highest ranked numeric sequence falls within a predetermined threshold.

23. The system as defined in claim 18, further comprising an audio component selectively and operatively connected to the speech recognition system, the audio component being configured to recite, in response to a command from the processor, the selected possible numeric sequence to the source of the utterance.

24. The system as defined in claim 18 wherein the system is configured to be used in a mobile vehicle.

* * * * *